US012660063B2

(12) United States Patent
Lu et al.

(10) Patent No.: US 12,660,063 B2
(45) Date of Patent: Jun. 16, 2026

(54) INTELLIGENT MODULARIZED MULTI-FUNCTION LIGHTING DEVICE

(71) Applicant: Xiamen PVTECH Co., Ltd., Xiamen (CN)

(72) Inventors: Fuxing Lu, Xiamen (CN); Longyin Chen, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 287 days.

(21) Appl. No.: 18/398,182

(22) Filed: Dec. 28, 2023

(65) Prior Publication Data

US 2024/0422879 A1 Dec. 19, 2024

(30) Foreign Application Priority Data

Jun. 16, 2023 (CN) ......................... 202310720298.2

(51) Int. Cl.
*H05B 45/3725* (2020.01)
*H05B 45/10* (2020.01)
*H05B 45/20* (2020.01)

(52) U.S. Cl.
CPC ......... *H05B 45/3725* (2020.01); *H05B 45/10* (2020.01); *H05B 45/20* (2020.01)

(58) Field of Classification Search
CPC .... H05B 45/20; H05B 45/10; H05B 45/3725; H05B 45/37; H05B 45/50; H05B 45/59; H05B 45/345; H05B 45/36; H05B 45/375; H05B 45/38; H05B 45/00; H05B 45/325; H05B 45/3578; H05B 45/357; H05B 47/17; H05B 47/24; H05B 47/26; H05B 45/24; H05B 45/34; H05B 45/382; H05B 45/32; H05B 45/3577; H05B 45/395; H05B 45/46; F21Y 2115/10
See application file for complete search history.

(56) References Cited

U.S. PATENT DOCUMENTS

| | | | | |
|---|---|---|---|---|
| 11,019,694 | B2 * | 5/2021 | Mai | H05B 45/31 |
| 12,133,309 | B2 * | 10/2024 | Lu | H05B 47/11 |
| 12,207,366 | B2 * | 1/2025 | Hong | H05B 45/20 |
| 12,213,233 | B2 * | 1/2025 | Lu | H05B 45/3725 |
| 2017/0321849 | A1 * | 11/2017 | Xiong | H05B 45/345 |
| 2024/0147586 | A1 * | 5/2024 | Hong | H05B 45/59 |

* cited by examiner

*Primary Examiner* — Monica C King
(74) *Attorney, Agent, or Firm* — Bruce Stone LLP; Joseph A. Bruce

(57) ABSTRACT

An intelligent modularized multi-function lighting device includes a rectifying module, a voltage converting module, an electricity output module, a direct-current converting module, a lighting module and an external functional module. The rectifying module is connected to an external power source. The voltage converting module is connected to the rectifying module. The electricity output module is connected to the voltage converting module, and has a positive electrode output end and a negative electrode output end. The direct-current converting module is connected to the rectifying module, and has a direct-current output end, a signal output end and a grounding end. The lighting module is connected to the positive electrode output end and the negative electrode output end. The external functional module is detachably connected to the direct-current output end, the signal output end and the grounding end via the lighting module.

10 Claims, 4 Drawing Sheets

INTELLIGENT MODULARIZED MULTI-FUNCTION LIGHTING DEVICE

BACKGROUND OF THE INVENTION

1. Field of the Invention

The present invention relates to a lighting device, in particular to an intelligent modularized multi-function lighting device.

2. Description of the Prior Art

Due to technological advancements, the efficiency of lighting devices has been significantly improved. However, currently available intelligent lighting devices are already capable of providing various intelligent functions to align with future trends. Nevertheless, these currently available intelligent lighting devices typically use integrated circuits to integrate various functional circuits for providing diverse intelligent functions. As a result, users cannot freely choose the intelligent functions of these intelligent lighting devices according to their own needs. Therefore, the currently available intelligent lighting devices is not flexible in use and fails to meet actual requirements.

China Patent No. CN213656381U and China Patent No. CN217635443U both disclose lighting devices with intelligent functions, but these lighting devices still cannot not effectively solve the above problems.

SUMMARY OF THE INVENTION

One embodiment of the present invention provides an intelligent modularized multi-function lighting device, which includes a rectifying module, a voltage converting module, an electricity output module, a direct-current converting module, a lighting module and an external functional module. The rectifying module is connected to an external power source. The voltage converting module is connected to the rectifying module. The electricity output module is connected to the voltage converting module, and has a positive electrode output end and a negative electrode output end. The direct-current converting module is connected to the rectifying module, and has a direct-current output end, a signal output end and a grounding end. The lighting module is connected to the positive electrode output end and the negative electrode output end. The external functional module is detachably connected to the direct-current output end, the signal output end and the grounding end via the lighting module.

In one embodiment, the intelligent modularized multi-function lighting device further includes a filtering module. The rectifying module is connected to the external power source via the filtering module.

In one embodiment, the intelligent modularized multi-function lighting device further includes a power adjusting module. The power adjusting module is detachably connected to the voltage converting module.

In one embodiment, the lighting module has a low color-temperature light source, a high color-temperature light source, a first common positive electrode, a second common positive electrode, a first common negative electrode, a second common negative electrode, a low color-temperature light source negative electrode and a high color-temperature light source negative electrode. The first common positive electrode is connected to the positive electrode output end. The first common positive electrode is connected to the second common positive electrode via the low color-temperature light source and the high color-temperature light source. The first common negative electrode is connected to the negative electrode output end and the second common negative electrode. The low color-temperature light source negative electrode is connected the low color-temperature light source. The high color-temperature light source negative electrode is connected to the high color-temperature light source.

In one embodiment, the low color-temperature light source and the high color-temperature light source are light-emitting diodes (LEDs).

In one embodiment, the intelligent modularized multi-function lighting device further includes a light optimizing module. The second common positive electrode and the second common negative electrode are connected to one or more of the low color-temperature light source negative electrode and the high color-temperature light source negative electrode via the light optimizing module.

In one embodiment, the light optimizing module includes one or more of a flicker removing circuit and a color temperature adjusting circuit.

In one embodiment, the lighting module has a first direct-current connecting end, a second direct-current connecting end, a first signal connecting end, a second signal connecting end, a first ground connecting end and a second ground connecting end. The first direct-current connecting end is connected to the second direct-current connecting end. The first signal connecting end is connected to the second signal connecting end. The ground connecting end is connected to the second ground connecting end. The first direct-current output end, the signal output end and the grounding end are connected to the first direct-current connecting end, the first signal connecting end and the first ground connecting end. The external functional module is connected to the second direct-current connecting end, the second signal connecting end and the second ground connecting end.

In one embodiment, the intelligent modularized multi-function lighting device further includes a dimming module connected to the voltage converting module and configured to receive a dimming signal.

In one embodiment, the intelligent modularized multi-function lighting device further includes an isolating control module and an auxiliary power source module. The dimming module is connected to the auxiliary power source module and the voltage converting module via the isolating control module.

The intelligent modularized multi-function lighting device in accordance with the embodiments of the present invention may have the following advantages:

(1) In one embodiment of the present invention, the rectifying module of the intelligent modularized multi-function lighting device is connected to the voltage converting module and the direct-current converting module. The voltage converting module is connected to the electricity output module and further detachably connectable to the power adjusting module. In this way, the electricity output module can be connected to the lighting module through the positive electrode output end and negative electrode output end thereof, and further detachably connected to the modularized light optimizing module (which may include a flicker removing circuit and/or color temperature adjusting circuit). The direct-current converting module can be detachably connected to external functional modules (such as microwave sensors, smart remote controllers, etc.) through the direct-current output end, signal output end, and grounding end thereof. Via the above circuit design, the intelligent modularized multi-function lighting device can provide power adjusting, microwave sensing, flicker removing, color temperature adjusting, and intelligent remote-control functions. Additionally, due to the modularized design, the user can freely choose these functions Thus, the intelligent modularized multi-function lighting device can be more flexible in use and meet actual requirements.

(2) In one embodiment of the present invention, the intelligent modularized multi-function lighting device also includes a detachable dimming module that can achieve various dimming modes (voltage dimming, resistance dimming, and PWM dimming) to be compatible with different dimming mechanisms. Moreover, the user can decide whether to add or remove the dimming module based on his/her own needs. Therefore, the intelligent modularized multi-function lighting device can be more extensive in application.

(3) In one embodiment of the present invention, the intelligent modularized multi-function lighting device has dimming, power adjusting, and color temperature adjusting functions. The user can adjust one or more of brightness, power, and color temperature based on the actual requirements in order to achieve proper lighting effects without the lighting device always operating at maximum brightness. Consequently, the intelligent modularized multi-function lighting device can meet the requirements of various applications and effectively reduce energy consumption.

(4) In one embodiment of the present invention, the intelligent modularized multi-function lighting device has an external functional module, which can be a microwave sensor or an intelligent remote controller. Through the external functional module, the intelligent modularized multi-function lighting device can achieve various intelligent functions to meet the demands of various intelligent applications. Therefore, the intelligent modularized multi-function lighting device conform to future development trends.

(5) In one embodiment of the present invention, the design of the intelligent modularized multi-function lighting device is simple, so the intelligent modularized multi-function lighting device can achieve the desired technical effects without significantly increasing the cost thereof. Therefore, the intelligent modularized multi-function lighting device can effectively solve the problems of prior art.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
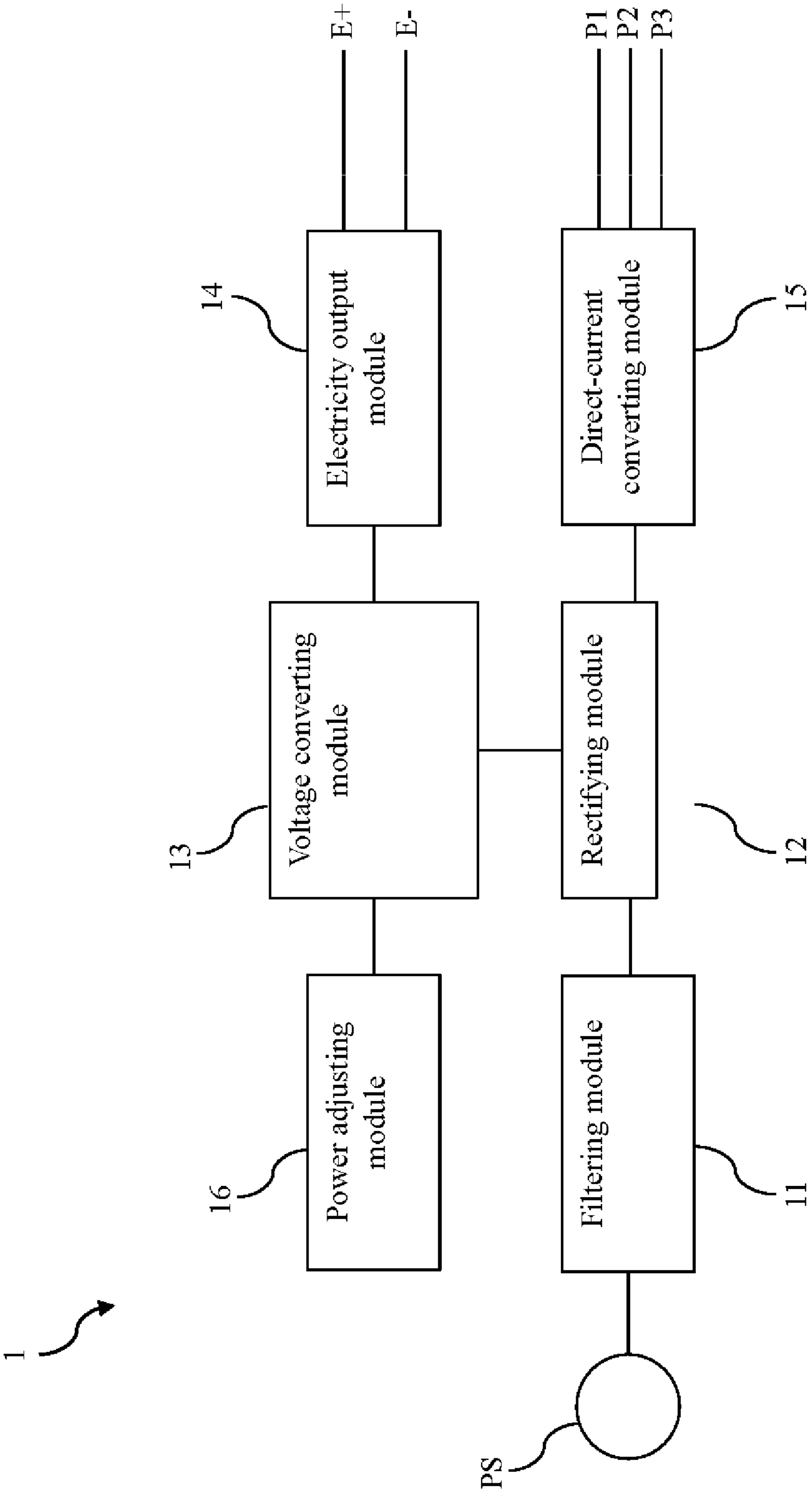
FIG. 1 is the block diagram of the main circuit structure of the intelligent modularized multi-function lighting device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which the block diagram of the main circuit structure of the intelligent modularized multi-function lighting device in accordance with one embodiment of the present invention. As shown in FIG. 1, the intelligent modularized multi-function lighting device 1 includes a filtering module 11, a rectifying module 12, a voltage converting module 13, an electricity output module 14, a direct-current (DC) converting module 15, and a power adjusting module 16.

The filtering module 11 is connected to an external power source PS. In one embodiment, the filtering module 11 can be a filter (such as a high-pass filter, low-pass filter, band-pass filter, or other various currently available filters). In one embodiment, the external power source PS can be a utility power, a generator, or other similar power sources.

The rectifying module 12 is connected to the filtering module 11. In one embodiment, the rectifying module 12 can be a bridge rectifier (such as a full-wave rectifier, half-wave rectifier, etc.).

The voltage converting module 13 is connected to the rectifying module 12. In one embodiment, the voltage converting module 13 can be a boost converter, buck converter, buck-boost converter, or other similar components.

The electricity output module 14 is connected to the voltage converting module 13 and has a positive electrode output end E+ and a negative electrode output end E−. In one embodiment, the electricity output module 14 can be a device containing a switch circuit to reduce high-frequency signal interference and stabilize power output.

The direct-current converting module 15 is connected to the rectifying module 12 and has a direct-current output end P1, a signal output end P2, and a grounding end P3. In one embodiment, the direct-current output end P1 can be a 5V voltage output end, and the signal output end P2 can be a pulse-width modulation (PWM) signal output end.

The power adjusting module 16 is detachably connected to the voltage converting module 13. In one embodiment, the power adjusting module 16 is a switch circuit used to control the power of the voltage converting module 13.

The input voltage of the external power source PS passes through the filtering module 11 and rectifying module 12, entering the direct-current converting module 15 for output, such that the direct-current converting module 15 can output converting signals through the multiple output ends thereof. The input voltage of the external power source PS also passes through the filtering module 11 and rectifying module 12, entering the voltage converting module 13. Then, the voltage converting module 13 generates a converting signal and output the converting signal via the electricity output module 14.

The embodiment just exemplifies the present invention and is not intended to limit the scope of the present invention; any equivalent modification and variation according to the spirit of the present invention is to be also included within the scope of the following claims and their equivalents.

Figure 2:
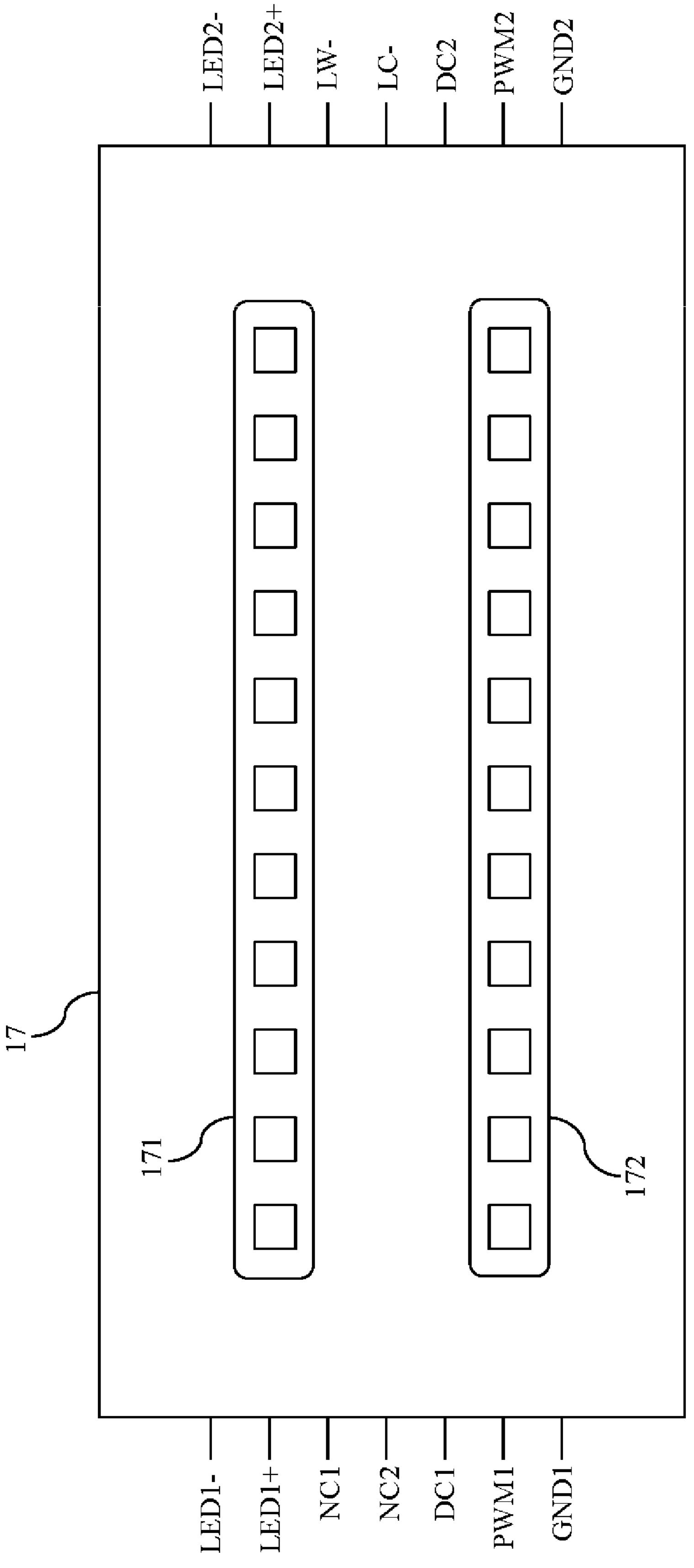
FIG. 2 is the schematic view of the lighting module of the intelligent modularized multi-function lighting device in accordance with one embodiment of the present invention.
Figure 3:
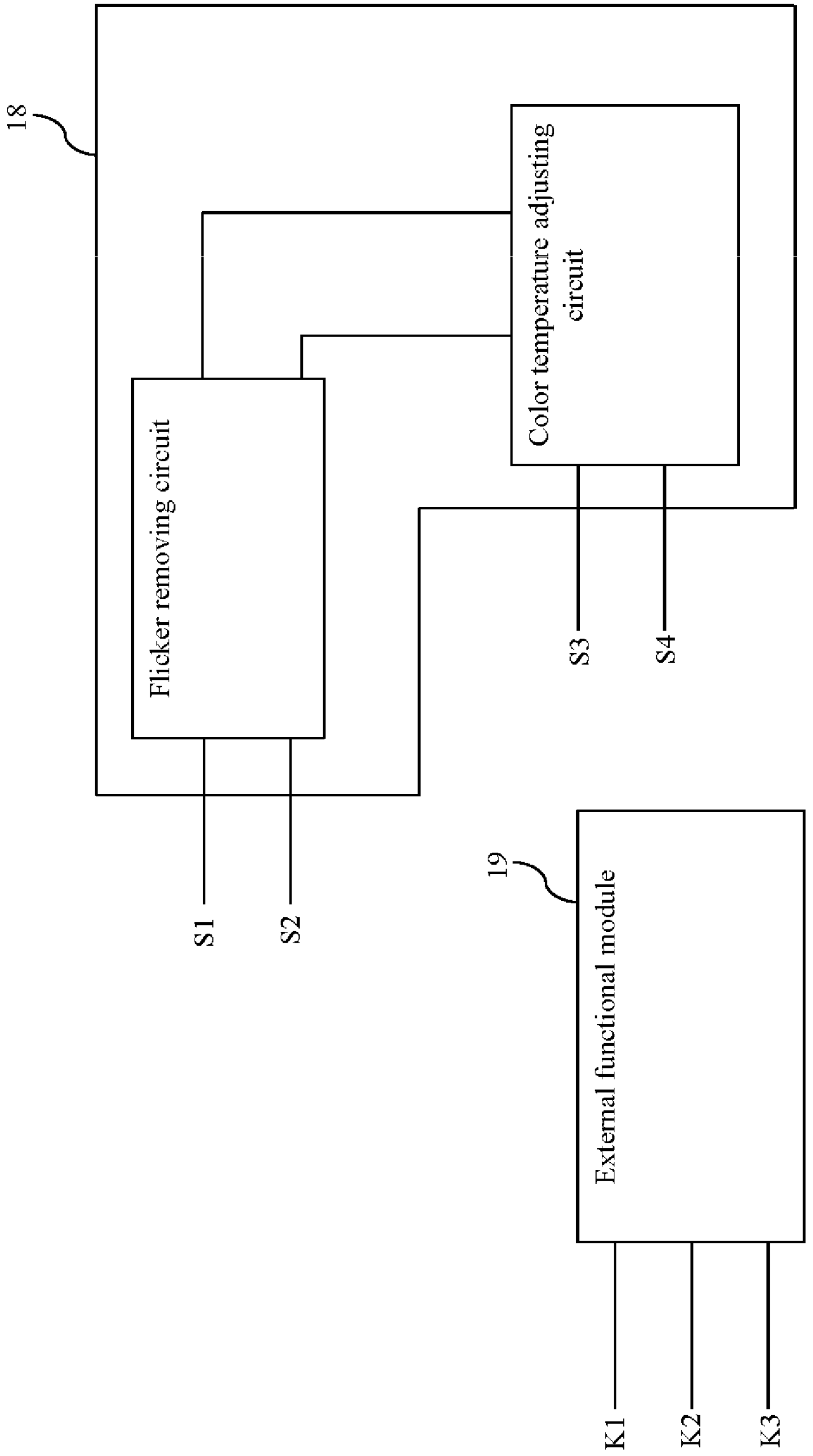
FIG. 3 is the block diagram of the circuit structures of the light optimizing module and the external functional module of the intelligent modularized multi-function lighting device in accordance with one embodiment of the present invention.

Please refer to FIG. 2 and FIG. 3; please also refer to FIG. 1. FIG. 2 is the schematic view of the lighting module of the intelligent modularized multi-function lighting device in accordance with one embodiment of the present invention. FIG. 3 is the block diagram of the circuit structures of the light optimizing module and the external functional module of the intelligent modularized multi-function lighting device in accordance with one embodiment of the present invention. As shown in FIG. 2 and FIG. 3, the intelligent modularized multi-function lighting device 1 further includes a lighting module 17 and a lighting optimizing module 18.

The lighting module 17 is connected to the positive electrode output end E+ and negative electrode output end E−. The lighting module 17 has a low-color temperature light source 171, a high-color temperature light source 172, a first common positive electrode LED1+, a second common positive electrode LED2+, a first common negative electrode LED1−, a second common negative electrode LED2−, a low-color temperature light source negative electrode LW−, a high-color temperature light source negative electrode LC−, a first direct-current connecting end DC1, a second direct-current connecting end DC2, a first signal connecting end PWM1, a second signal connecting end PWM2, a first ground connecting end GND1, and a second ground connecting end GND2. The low-color temperature light source 171 may include multiple low-color temperature light-emitting diodes (LEDs) connected in series, and the high-color temperature light source 172 may include multiple high-color temperature LEDs connected in series. The contact NC1 is connected to the low-color temperature light source negative electrode LW− and the low-color temperature light source 171. The contact NC2 is connected to the high-color temperature light source negative electrode LC− and the high-color temperature light source 172. In this embodiment, the contacts NC1 and NC2 are not used.

The first common positive electrode LED1+ is connected to the positive electrode output end E+ and is connected to the second common positive electrode LED2+ through the low-color temperature light source 171 and the high-color temperature light source 172. The first common negative electrode LED1− is connected to the negative electrode output end E− and the second common negative electrode LED2−. The low-color temperature light source negative electrode LW− is connected to the low-color temperature light source 171, and the high-color temperature light source negative electrode LC− is connected to the high-color temperature light source 172.

The first direct-current connecting end DC1 is connected to the second direct-current connecting end DC2. The first signal connecting end PWM1 is connected to the second signal connecting end PWM2. The first ground connecting end GND1 is connected to the second ground connecting end GND2. The direct-current output end P1, signal output end P2, and grounding end P3 are respectively connected to the first direct-current connecting end DC1, the first signal connecting end PWM1, and the first ground connecting end GND1.

The lighting optimizing module 18 includes a flicker removing circuit 181 and a color temperature adjusting circuit 182. The flicker removing circuit 181 and color temperature adjusting circuit 182 are modularized circuits, so the user can remove either the flicker removing circuit 181 or the color temperature adjusting circuit 182.

The lighting optimizing module 18 has a first connector S1, a second connector S2, a third connector S3, and a fourth connector S4. The first connector S1 and the second connector S2 can be detachably connected to the second common positive electrode LED2+ and the second common negative electrode LED2− respectively. The third connector S3 and the fourth connector S4 are also detachable.

When the third connector S3 is connected to the low-color temperature light source negative electrode LW−, the low-color temperature light source 171 is activated, so the light emitted by the lighting module 17 is of low color temperature. When the fourth connector S4 is connected to the high-color temperature light source negative electrode LC−, the high-color temperature light source 172 is activated, so the light emitted by the lighting module 17 is of high color temperature. When the third connector S3 and the fourth connector S4 are connected respectively to the low-color temperature light source negative electrode LW− and the high-color temperature light source negative electrode LC−, both the low-color temperature light source 171 and the high-color temperature light source 172 are activated to generate a mixed light of high and low color temperatures. In other words, the second common positive electrode LED2+ and the second common negative electrode LED2− can be connected to either the low-color temperature light source negative electrode LW− or the high-color temperature light source negative electrode LC−, or both, through the lighting optimizing module 18.

Therefore, the user can activate a either the low-color temperature light source 171 or the high-color temperature light source 172, or both simultaneously, to adjust the color temperature of the light emitted by the lighting module 17 through the above circuit structure. Additionally, the user can fine-tune the color temperature of the light emitted by the lighting module 17 through the color temperature adjusting circuit 182. The color temperature adjusting circuit 182 can receive a color temperature adjusting signal transmitted by the user through an electronic device (such as a smartphone, a tablet computer, etc.) for color temperature adjustment. The circuit structure of the color temperature adjusting circuit 182 is well known to those skilled in the art and is not further elaborated here. In addition, the flicker removing circuit 181 can provide the flicker removing function so as to optimize the light emitted by the lighting module 17.

In another embodiment, the user can directly remove the lighting optimizing module 18, such that the second common positive electrode LED2+ and the second common negative electrode LED2− are connected to one or more of the low-color temperature light source negative electrode LW− and the high-color temperature light source negative electrode LC−. For example, when the second common positive electrode LED2+ and the second common negative electrode LED2− are connected to the low-color temperature light source negative electrode LW−, the low-color temperature light source 171 is activated, such that the light emitted by the lighting module 17 is of low color temperature. For example, when the second common positive electrode LED2+ and the second common negative electrode LED2− are connected to the high-color temperature light source negative electrode LC−, the high-color temperature light source 172 is activated, such that the light emitted by the lighting module 17 is of high color temperature. For example, when the second common positive electrode LED2+ and the second common negative electrode LED2− are connected to both the low-color temperature light source negative electrode LW− and the high-color temperature light source negative electrode LC−, both the low-color temperature light source 171 and the high-color temperature light source 172 are activated, such that the light emitted by the lighting module 17 is a mixed light of high and low color temperatures.

Additionally, the intelligent modularized multi-function lighting device 1 includes an external functional module 19. The external functional module 19 has a DC connector K1, a signal connector K2, and a ground connector K3. The DC connector K1, signal connector K2, and ground connector K3 can be detachably connected to the second direct-current connecting end DC2, second signal connecting end PWM2, and second ground connecting end GND2 of the lighting module 17, respectively. Thus, the external functional module 19 can be detachably connected to the direct-current output end P1, signal output end P2, and grounding end P3 of the direct-current converting module 15 through the lighting module 17. In this embodiment, the external functional module 19 can be a microwave sensor. In this way, the intelligent modularized multi-function lighting device 1 can provide microwave sensing function to detect moving objects.

In another embodiment, the external functional module 19 can be an intelligent remote controller. In this way, the intelligent modularized multi-function lighting device 1 can provide intelligent remote-control function. The user can transmit a control signal via an electronic device (such as a smartphone, a tablet computer, etc.) to remotely control the intelligent modularized multi-function lighting device 1. The external functional module 19 can vary according to actual needs and is not limited to a microwave sensor or intelligent remote controller.

Furthermore, the intelligent modularized multi-function lighting device 1 can also include a detachable dimming module to achieve various dimming modes.

As described above, the rectifying module 12 of the intelligent modularized multi-function lighting device 1 is connected to the voltage converting module 13 and the direct-current converting module 15. The voltage converting module 13 is connected to the electricity output module 14 and is detachably connected to the power adjusting module 16. Thus, the electricity output module 14 can be connected to the lighting module 17 through the positive electrode output end E+ and negative electrode output end E− thereof, and then, through the lighting module 17, detachably connected to the modularized lighting optimizing module 18 (which may include a flicker removing circuit and/or color temperature adjusting circuit). The direct-current converting module 15 can be detachably connected to the external functional module 19 (such as a microwave sensor, smart remote controller, etc.) through the direct-current output end P1, signal output end P2, and grounding end P3 thereof. Via the above circuit design, the intelligent modularized multi-function lighting device 1 can provide power adjusting function, microwave sensing function, flicker removing function, color temperature adjusting function, and intelligent remote-control function. Additionally, due to the modularized design mentioned above, the user can freely choose these functions. Therefore, the intelligent modularized multi-function lighting device 1 is more flexible in use and can meet actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that currently available intelligent lighting devices typically use integrated circuits to integrate various functional circuits for providing diverse intelligent functions. As a result, users cannot freely choose the intelligent functions of these intelligent lighting devices according to their own needs. Therefore, the currently available intelligent lighting devices is not flexible in use and fails to meet actual requirements. By contract, according to one embodiment of the present invention, the rectifying module of the intelligent modularized multi-function lighting device is connected to the voltage converting module and the direct-current converting module. The voltage converting module is connected to the electricity output module and further detachably connectable to the power adjusting module. In this way, the electricity output module can be connected to the lighting module through the positive electrode output end and negative electrode output end thereof, and further detachably connected to the modularized light optimizing module (which may include a flicker removing circuit and/or color temperature adjusting circuit). The direct-current converting module can be detachably connected to external functional modules (such as microwave sensors, smart remote controllers, etc.) through the direct-current output end, signal output end, and grounding end thereof. Via the above circuit design, the intelligent modularized multi-function lighting device can provide power adjusting, microwave sensing, flicker removing, color temperature adjusting, and intelligent remote-control functions. Additionally, due to the modularized design, the user can freely choose these functions Thus, the intelligent modularized multi-function lighting device can be more flexible in use and meet actual requirements.

Also, according to one embodiment of the present invention, the intelligent modularized multi-function lighting device also includes a detachable dimming module that can achieve various dimming modes (voltage dimming, resistance dimming, and PWM dimming) to be compatible with different dimming mechanisms. Moreover, the user can decide whether to add or remove the dimming module based on his/her own needs. Therefore, the intelligent modularized multi-function lighting device can be more extensive in application.

Further, according to one embodiment of the present invention, the intelligent modularized multi-function lighting device has dimming, power adjusting, and color temperature adjusting functions. The user can adjust one or more of brightness, power, and color temperature based on the actual requirements in order to achieve proper lighting effects without the lighting device always operating at maximum brightness. Consequently, the intelligent modularized multi-function lighting device can meet the requirements of various applications and effectively reduce energy consumption.

Moreover, according to one embodiment of the present invention, the intelligent modularized multi-function lighting device has an external functional module, which can be a microwave sensor or an intelligent remote controller. Through the external functional module, the intelligent modularized multi-function lighting device can achieve various intelligent functions to meet the demands of various intelligent applications. Therefore, the intelligent modularized multi-function lighting device conform to future development trends.

Furthermore, according to one embodiment of the present invention, the design of the intelligent modularized multi-function lighting device is simple, so the intelligent modularized multi-function lighting device can achieve the desired technical effects without significantly increasing the cost thereof. Therefore, the intelligent modularized multi-function lighting device can effectively solve the problems of prior art. As set forth above, the intelligent modularized multi-function lighting device according to the embodiments of the present invention can definitely achieve great technical effects.

Figure 4:
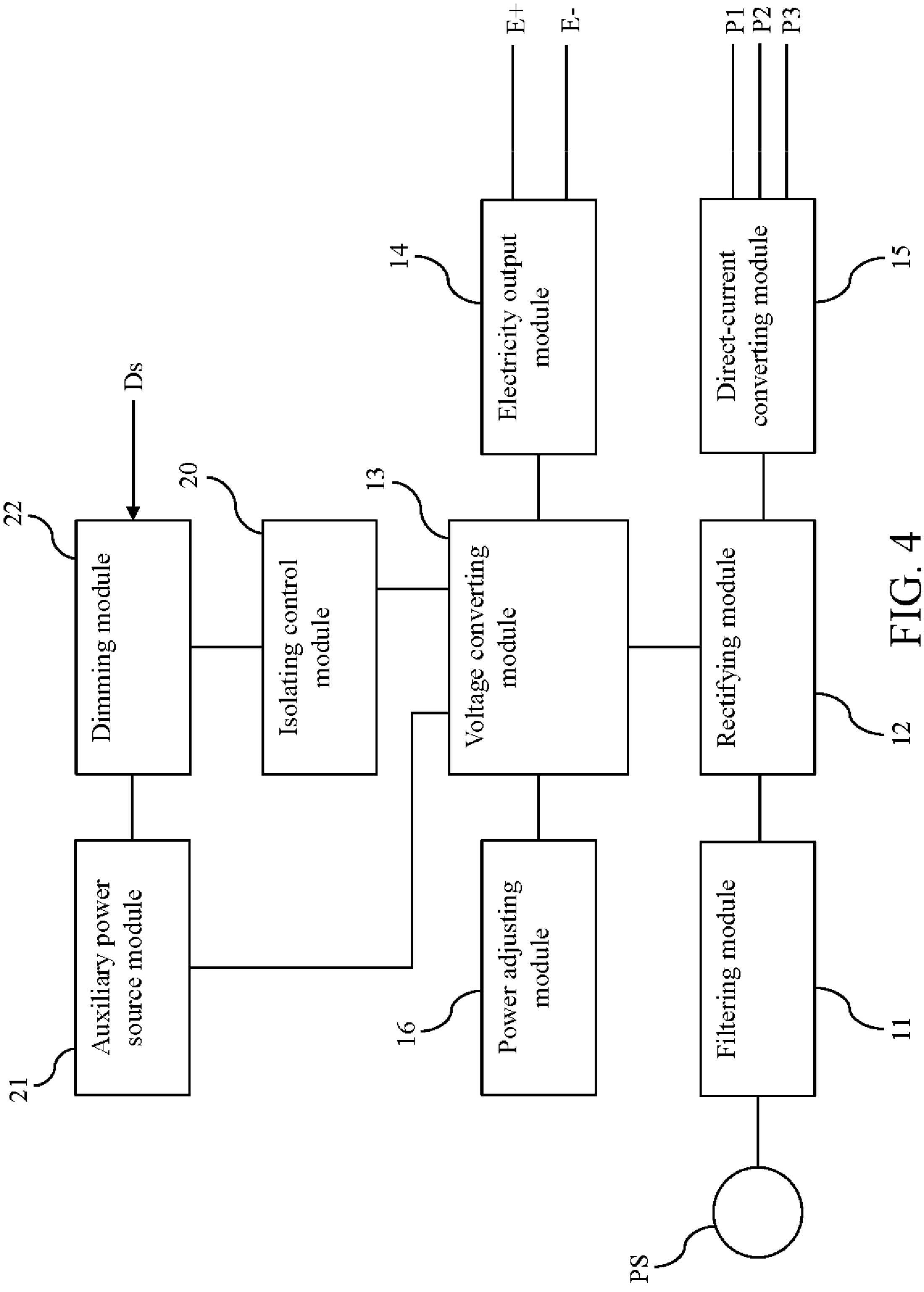
FIG. 4 is the block diagram of the main circuit structure of the intelligent modularized multi-function lighting device in accordance with another embodiment of the present invention.

Please refer to FIG. 4, which is the block diagram of the main circuit structure of the intelligent modularized multi-function lighting device in accordance with another embodiment of the present invention. Please also refer to FIG. 2 and FIG. 3. As shown in FIG. 4, the intelligent modularized multi-function lighting device 1 includes a filtering module 11, a rectifying module 12, a voltage converting module 13, an electricity output module 14, a direct-current converting module 15, a power adjusting module 16, a lighting module 17, a lighting optimizing module 18 and an external functional module 19.

The above elements of this embodiment are similar to those of the previous embodiment, so these elements will not be described herein again. The difference between this embodiment and the previous embodiment is that the intelligent modularized multi-function lighting device 1 of this embodiment further includes an isolating control module 20, an auxiliary power source 21 and a dimming module 22. The isolating control module 20, auxiliary power source 21 and dimming module 22 are detachable.

The isolating control module 20 and the auxiliary power source module 21 are connected to the voltage converting module 13. The dimming module 22 is connected to the isolating control module 20 and the auxiliary power source module 21.

The isolating control module 20 can provide isolating control function, which can be any one of currently available isolating control circuits. The circuit structure of the isolating control circuit 20 is well known to those skilled in the art and will not be described herein again.

The voltage converting module 13 can supply power to the auxiliary power source module 21, such that the auxiliary power source module 21 can power the dimming module 22. In one embodiment, the auxiliary power source module 21 is a rechargeable battery, such as a Li-Ion battery, Ni—Cd battery, Ni-MH battery, or other similar components.

The dimming module 22 can support various dimming modes (such as voltage dimming, resistance dimming, and PWM dimming) to be compatible with various dimming mechanisms. The user can transmit a dimming signal Ds to the dimming module 22 via an electronic device (such as a smartphone, a tablet computer, etc.) or a switch to perform the dimming function so as to adjust the brightness of the intelligent modularized multi-function lighting device 1.

As previously stated, the intelligent modularized multi-function lighting device 1 can further include the detachable dimming module 22, which can implement various dimming modes (voltage dimming, resistance dimming, and PWM dimming) to be compatible with various dimming mechanisms. Additionally, the user can decide whether to add or remove the dimming module 22 according to his/her own needs. Therefore, the application of the intelligent modularized multi-function lighting device 1 can be more extensive.

Therefore, the intelligent modularized multi-function lighting device 1 can provide dimming, power adjusting, and color temperature adjusting functions. The user can adjust brightness, power, and color temperature according to the actual requirements with a view to achieving proper lighting effects, so the intelligent modularized multi-function lighting device 1 does not need to always operate at maximum brightness. Accordingly, the intelligent modularized multi-function lighting device 1 can meet the requirements of different applications and effectively reduce energy consumption.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the rectifying module of the intelligent modularized multi-function lighting device is connected to the voltage converting module and the direct-current converting module. The voltage converting module is connected to the electricity output module and further detachably connectable to the power adjusting module. In this way, the electricity output module can be connected to the lighting module through the positive electrode output end and negative electrode output end thereof, and further detachably connected to the modularized light optimizing module (which may include a flicker removing circuit and/or color temperature adjusting circuit). The direct-current converting module can be detachably connected to external functional modules (such as microwave sensors, smart remote controllers, etc.) through the direct-current output end, signal output end, and grounding end thereof. Via the above circuit design, the intelligent modularized multi-function lighting device can provide power adjusting, microwave sensing, flicker removing, color temperature adjusting, and intelligent remote-control functions. Additionally, due to the modularized design, the user can freely choose these functions Thus, the intelligent modularized multi-function lighting device can be more flexible in use and meet actual requirements.

Also, according to one embodiment of the present invention, the intelligent modularized multi-function lighting device also includes a detachable dimming module that can achieve various dimming modes (voltage dimming, resistance dimming, and PWM dimming) to be compatible with different dimming mechanisms. Moreover, the user can decide whether to add or remove the dimming module based on his/her own needs. Therefore, the intelligent modularized multi-function lighting device can be more extensive in application.

Further, according to one embodiment of the present invention, the intelligent modularized multi-function lighting device has dimming, power adjusting, and color temperature adjusting functions. The user can adjust one or more of brightness, power, and color temperature based on the actual requirements in order to achieve proper lighting effects without the lighting device always operating at maximum brightness. Consequently, the intelligent modularized multi-function lighting device can meet the requirements of various applications and effectively reduce energy consumption.

Moreover, according to one embodiment of the present invention, the intelligent modularized multi-function lighting device has an external functional module, which can be a microwave sensor or an intelligent remote controller. Through the external functional module, the intelligent modularized multi-function lighting device can achieve various intelligent functions to meet the demands of various intelligent applications. Therefore, the intelligent modularized multi-function lighting device conform to future development trends.

Furthermore, according to one embodiment of the present invention, the design of the intelligent modularized multi-function lighting device is simple, so the intelligent t modularized multi-function lighting device can achieve the desired technical effects without significantly increasing the cost thereof. Therefore, the intelligent modularized multi-function lighting device can effectively solve the problems of prior art.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intelligent modularized multi-function lighting device, comprising:

- a rectifying module connected to an external power source;
- a voltage converting module connected to the rectifying module;
- an electricity output module connected to the voltage converting module, and having a positive electrode output end and a negative electrode output end;
- a direct-current converting module connected to the rectifying module, and having a direct-current output end, a signal output end and a grounding end;
- a lighting module connected to the positive electrode output end and the negative electrode output end; and
- an external functional module detachably connected to the direct-current output end, the signal output end and the grounding end via the lighting module.

2. The intelligent modularized multi-function lighting device as claimed in claim 1, further comprising a filtering module, wherein the rectifying module is connected to the external power source via the filtering module.

3. The intelligent modularized multi-function lighting device as claimed in claim 1, further comprising a power adjusting module detachably connected to the voltage converting module.

4. The intelligent modularized multi-function lighting device as claimed in claim 1, wherein the lighting module has a low color-temperature light source, a high color-temperature light source, a first common positive electrode, a second common positive electrode, a first common negative electrode, a second common negative electrode, a low color-temperature light source negative electrode and a high color-temperature light source negative electrode, wherein the first common positive electrode is connected to the positive electrode output end, wherein the first common positive electrode is connected to the second common positive electrode via the low color-temperature light source and the high color-temperature light source, wherein the first common negative electrode is connected to the negative electrode output end and the second common negative electrode, wherein the low color-temperature light source negative electrode is connected the low color-temperature light source, wherein the high color-temperature light source negative electrode is connected to the high color-temperature light source.

5. The intelligent modularized multi-function lighting device as claimed in claim 4, wherein the low color-temperature light source and the high color-temperature light source are light-emitting diodes.

6. The intelligent modularized multi-function lighting device as claimed in claim 4, further comprising a light optimizing module, where the second common positive electrode and the second common negative electrode are connected to one or more of the low color-temperature light source negative electrode and the high color-temperature light source negative electrode via the light optimizing module.

7. The intelligent modularized multi-function lighting device as claimed in claim 6, wherein the light optimizing module comprises one or more of a flicker removing circuit and a color temperature adjusting circuit.

8. The intelligent modularized multi-function lighting device as claimed in claim 1, wherein the lighting module has a first direct-current connecting end, a second direct-current connecting end, a first signal connecting end, a second signal connecting end, a first ground connecting end and a second ground connecting end, wherein the first direct-current connecting end is connected to the second direct-current connecting end, wherein the first signal connecting end is connected to the second signal connecting end, wherein the ground connecting end is connected to the second ground connecting end, wherein the first direct-current output end, the signal output end and the grounding end are connected to the first direct-current connecting end, the first signal connecting end and the first ground connecting end, wherein the external functional module is connected to the second direct-current connecting end, the second signal connecting end and the second ground connecting end.

9. The intelligent modularized multi-function lighting device as claimed in claim 1, further comprising a dimming module connected to the voltage converting module and configured to receive a dimming signal.

10. The intelligent modularized multi-function lighting device as claimed in claim 1, further comprising an isolating control module and an auxiliary power source module, wherein the dimming module is connected to the auxiliary power source module and the voltage converting module via the isolating control module.

* * * * *